United States Patent [19]

Watanabe et al.

[11] 3,899,781

[45] Aug. 12, 1975

[54] MAGNETIC BUBBLE TRANSMISSION SYSTEM USING A ROTATING MAGNETIC FIELD

[75] Inventors: Teruji Watanabe, Niza; Hideo Ishihara, Kamakura, both of Japan

[73] Assignee: Kokusai Denshin Denwa Kabushiki Kaisha, Japan

[22] Filed: June 21, 1974

[21] Appl. No.: 481,889

[30] Foreign Application Priority Data

June 22, 1973 Japan ................................ 48-69900

[52] U.S. Cl. ........ 340/174 TF; 340/174 TF;174 QA

[51] Int. Cl. ............................................ G11c 11/14

[58] Field of Search ................ 340/175 TF, 174 QA

[56] References Cited

UNITED STATES PATENTS

| | | | |
|---|---|---|---|
| 3,772,661 | 11/1973 | Oshima et al. | 340/174 TF |
| 3,778,789 | 12/1973 | Watanabe et al. | 340/174 TF |

*Primary Examiner*—James W. Moffitt
*Attorney, Agent, or Firm*—Robert E. Burns; Emmanuel J. Lobato; Bruce L. Adams

[57] ABSTRACT

A magnetic bubble transmission system, in which a magnetic bubble produced in a magnetic thin plate under application thereto of a bias magnetic field is transmitted by the application of rotating magnetic field along the magnetic thin film. A honeycomb soft magnetic thin film having a honeycomb pattern formed into substantially hexagonal patterns is disposed on said magnetic thin plate in close contact therewith. A direction specifying thin film for giving priority order of the transmission of the magnetic bubble from each of branching positions of the honeycomb soft magnetic thin film positioned at each vertex of each of the hexagonal patterns to three sides contiguous to the branching positions is disposed on at least one of said three sides. The bias magnetic field is reduced and restored in synchronism with the rotation cycle of said rotating magnetic field to a predetermined direction, so that the magnetic bubble captured at one of the branching positions is transferred to an adjacent branching position through one of the three sides determined by the priority order.

5 Claims, 32 Drawing Figures

MAGNETIC BUBBLE TRANSMISSION SYSTEM USING A ROTATING MAGNETIC FIELD

This invention relates to a magnetic bubble transmission system, in which a cylindrical magnetic bubble produced in a magnetic thin plate of rate earth orthoferrite, magnetic garnet, amorphous magnetic substance of the like is transmitted in the plane of the thin plate.

It is known in the art that when a thin plate formed by rare earth orthoferrite magnetic garnet, amorphous magnetic substance or the like in such a manner, that its crystal axis C is perpendicular to the surface of the thin plate (hereinafter referred to as the magnetic thin plate), is impressed with an appropriate DC magnetic field (hereinafter referred to as the bias magnetic field) in a direction perpendicular to the surface of the thin plate, there is produced cylindrical magnetic bubbles (hereinafter referred as magnetic bubbles) magnetized in a direction opposite to the bias magnetic field. It is also known that since the magnetic bubbles can be shifted and transmitted in a plane in the magnetic thin plate at their cylindrical shapes by providing a gradient of the bias magnetic field at each end of domain walls forming the magnetic bubbles, this is applicable to various information processing circuits such as a memory circuit, a logical operation circuit and the like utilizing the magnetic bubbles in the form of binary information "1" and "0" corresponding to their presence and absence respectively.

Various systems are known for the transmission of the magnetic bubbles in the magnetic thin plate. In the known systems, there is such a system that special patterns are each fomed by a soft magnetic thin film, such as soft permally, or the like on the magnetic thin plate so that the magnetic bubbles are transmitted as they are captured at one part of each pattern by sequentially magnetizing the patterns with an applied rotating magnetic field.

However, this kind of conventional magnetic bubble transmission system is excellent for one-dimensional transmission of the magnetic bubble but inconvenient for two dimensional transmission of the magnetic bubble, and hence is defective in that much plane is wasted in the case of forming a logical operation circuit.

An object of this invention is tp provide a megnetic bubble transmission system adapted to overcome the defect of the prior art by the employment of a honeycomb soft magnetic pattern for magnetic bubble transmission.

The principle, construction and operations of this invention will be understood from the following detailed description taken in conjunction with the accompanying drawings, in which:

FIGS. 3A, 3B, 3C, 7A, 7B, 7C, 8A, 8B, 8C and 8D are plane views illustrating examples of applications of the magnetic bubble transmission system of this invention.

With reference to FIGS. 1A, 1B, 1C, 1D, 1E, 1F and 1G, the magnetic bubble transmission path for use in the magnetic bubble transmission system of this invention will be described.

Figures 1A, 1B, 1C, 1D, 1E, 1F, 1G:
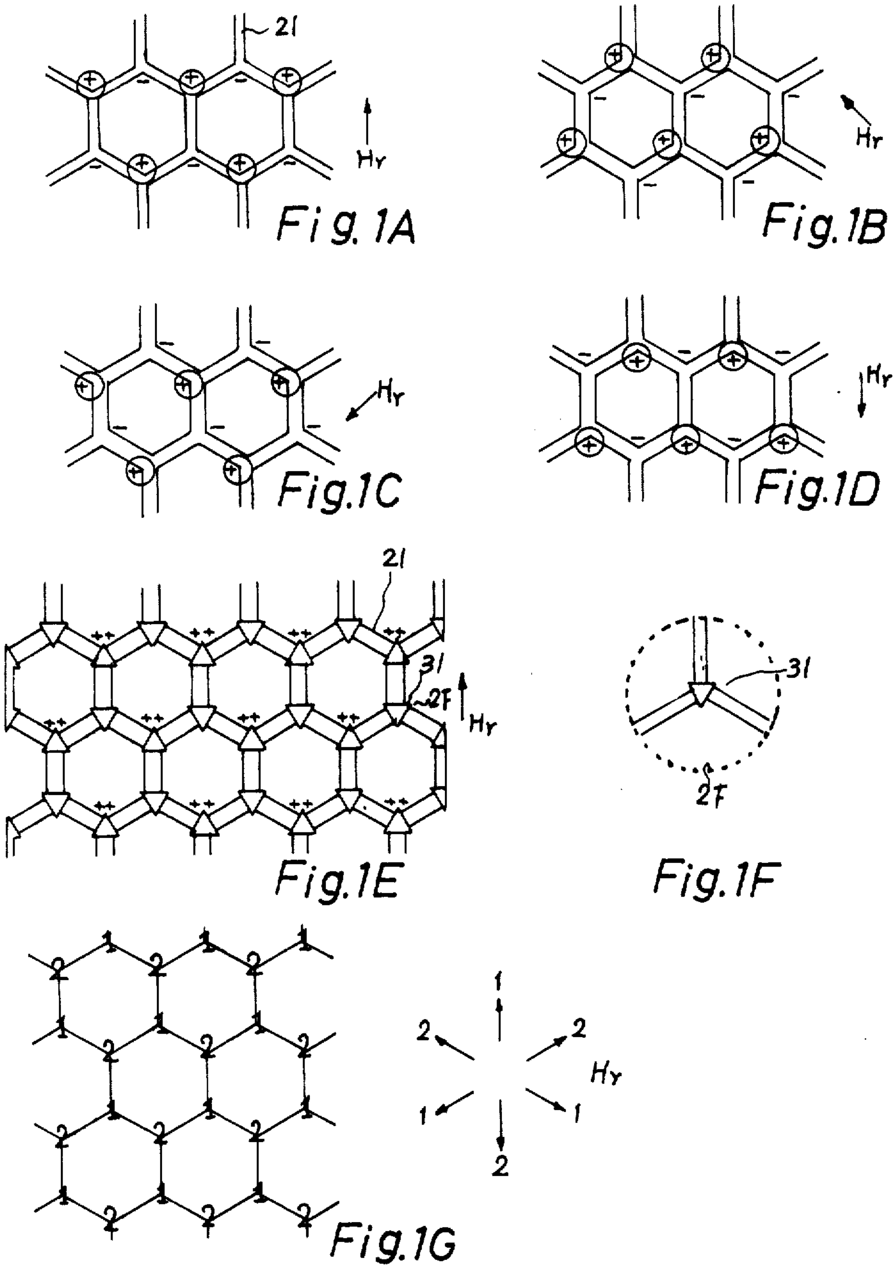
FIGS. 1A, 1B, 1C, 1D, 1E, 1F and 1G are plane views explanatory of te principle of this invention.

FIG. 1A shows a state, in which a soft magnetic thin film 21 (thereinafter referred as a transmission thin film) of the so-called honeycomb configuration of substantially hexagonal patterns is disposed in close contact with the magnetic thin plate (not shown) for magnetic bubble transmission, and in which the magnetic field Hr is applied to the magnetic thin plate along its plane in a direction of an arrow shown on the right-hand side. In such as state, branching positions of the honeycomb thin film corresponding to vertexes of the aforementioned hexagonal patterns are magnetized to have polarities indicated by (+) and (−), so that the magnetic bubbles are attracted to the position of (+) or (−) in accordance with its magnetized direction. For example, if the magnetic bubble is magnetized negative at the side where it contracts with the transmission thin film 21, the magnetic bubble is attracted to the positive magnetic pole of the transmission thin film 21, so that each branching position marked with a circle is a stable rest position of the magnetic bubble.

If the magnetic field Hr applied along the plane of the magnetic thin plate is turned by an angle of 60° in the counter-clockwise direction, the state of magnetization of each branching position of the transmission thin film 21 becomes such as shown in FIG. 1B, so that all the stable rest positions shift by a length of one side of each hexagonal pattern in comparison with the state shown in FIG. 1A. In case of further turning the magnetic field Hr in the counter-clockwise direction, the state of magnetization of each branching position is reversed from positive to negative and vice versa as shown in FIGS. 1C and 1D at every rotation angle 60° of the magnetic field Hr. As a result of this, the stable rest positions of the magnetic bubbles also shift by a length of one side of the hexagonal pattern. Consequently, the transmission thin film 21 is a magnetic bubble transmission path, in which the magnetic bubbles shift by a length corresponding to the six sides of the hexagonal pattern during one rotation of the magnetic field Hr along the plane of the magnetic thin plate. The magnetic field Hr applied along the plane of the magnetic thin plate will hereinafter be referred as the rotating magnetic field Hr.

FIG. 1E illustrates means for intensifying a magnetization produced by the rotating magnetic field Hr at each of the branching positions of the transmission thin film 21. Projections 31 such as shown are formed at the branching positions of the transmission thin film 21 for the purpose of concentration of the magnetic field. The branching position 2F is shown on an enlarged scale in FIG. 1F.

FIG. 1G is a diagram showing the relationship between the direction of the rotating magnetic field applied to the transmission path and the position of the magnetic bubble corresponding thereto. When the rotating magnetic field Hr rotates along directions of the arrows shown at the right-hand side, the magnetic bubbles are attracted to the branching positions indicated by the same reference numerals as those corresponding to the arrows, respectively. As is apparent from this illustration, the state of magnetization of the transmission path has no relation to the direction of rotation of the rotating magnetic field. Even where the magnetic bubble is captured at any branching position, a transmission path which is capable of transmitting the magnetic bubble in three direction at the same time is provided by the next exciting period. In this case, the forces tending to transmit the magnetic bubble are equal to one another in the three directions, so that the magnetic bubble cannot be transmitted in one direction only by the transmission thin film 21.

Figure 2A:
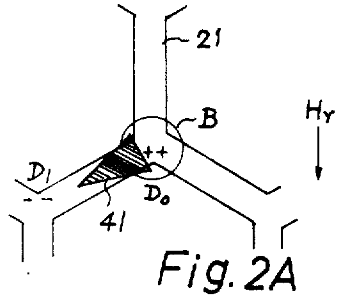
FIGS. 2A, 2B, 2C, 4A, 4B, 4C, 4D, 4E, 5A, 5B, 5C, 5D, 5E, 5F and 5G are plane views explanatory of means for specifying and controlling the transmission direction of a magnetic bubble employed in this invention.
Figure 3A:
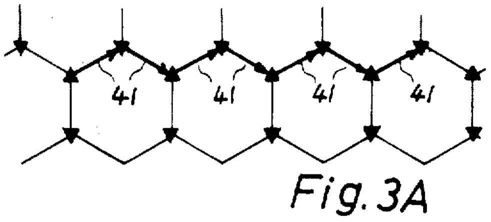
Figure 2B:
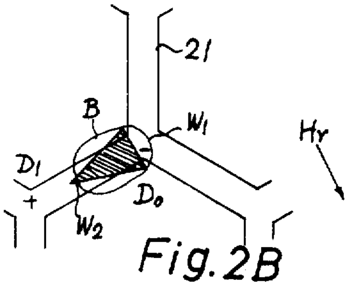
Figure 3B:
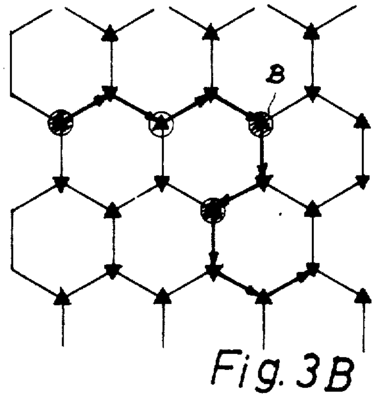
Figure 2C:
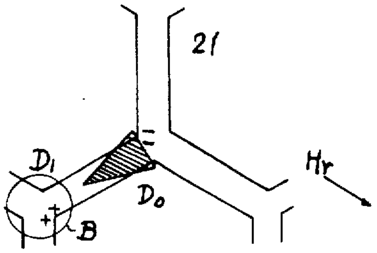
Figure 3C:
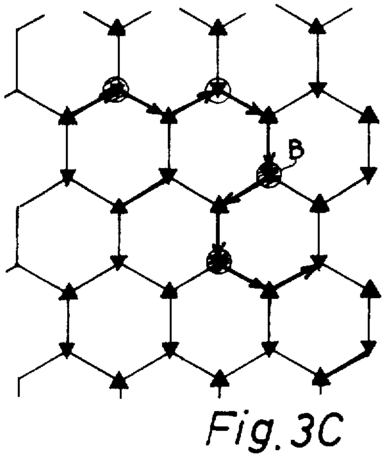

With reference to FIGS. 3A, 3B and 3C, transmission direction specifying means for transmitting the magnetic bubble in a required direction will be described. In FIG. 2A, a reference numeral 41 designates a soft magnetic thin film (hereinafter referred as a direction specifying thin film) for specifying the direction of transmission of the magnetic bubble to one direction. This direction specifying magnetic thin film disposed in close contact with the magnetic thin plate M on the opposite side from that on which the transmission thin film 21 is disposed. In a case where the rotating magnetic field Hr is applied in a direction indicated by an arrow at the right-hand side in FIG. 2A, the branching position $D_0$ of the transmission thin film 21 at the center of the illustration is magnetized positive so that the magnetic bubble B is captured at this branching position $D_0$ and stably stands still. Then, if the rotating magnetic field starts to turn in the counter-clockwise direction as shown in FIG. 2B, the magnitude of the bias magnetic field applied to the magnetic thin plate M is reduced a little. At this time, the magnetic bubble B is deformed from its circular configuration into a band-like form along the transmission thin film 21. In the three sides of the transmission thin film 21 contiguous to the branching position $D_0$, one side has the direction specifying thin film 41. Moreover, since the transmission thin film 21 and the direction specifying thin film 41 are disposed in such a manner that they hold the magnetic thin plate M therebetween, the magnetostatic energy for shifting the magnetic bubble is minimum in case of extending towards the side having the direction specifying thin film 41. Accordingly, as shown in FIG. 2B, the one end $W_1$ of the magnetic bubble hardly moves, while only the other end $W_2$ extends along the side having the direction specifying thin film 41 and approaches the adjoining branching position $D_1$. Then, if the magnitude of the bias magnetic field is restored to its original value at the same time as the rotating magnetic field Hr comes into coincident with one arm of the transmission thin film as shown in FIG. 2C, the magnetic bubble B is attracted to the intensified positive magnetization of the branching position $D_1$ to be returned to its original circular configuration and, at the same time, shifts to the branching position $D_1$ to stably rest there.

With reference to FIGS. 3A, 3B and 3C, an application of this invention to shift registers will be described. In FIGS. 3A, 3B and 3C, the transmission thin films 21 described above are shown in the form of straight lines with no widths, and two kinds of traingular marks (▲ and ▼) at the branching points indicate the positions where the magnetic bubbles may exist at the same time. Namely, the magnetic bubbles may exist at the positions of either of the upward and downward triangular marks ▲ and ▼.

FIG. 3A shows a shift register circuit of the simplest construction, in which the direction specifying thin films 41 are indicated by arrows.

FIGS. 3B and 3C illustrate shift register circuits different in construction from that of FIG. 3A, in which the hatched circles indicate positions where the magnetic bubbles representing 1 of binary information exist. Accordingly, the contents of the shift register circit indicated by a series of arrows assume states "1011". FIG. 3C shows the state, in which the rotating magnetic field has turned by an angle of 60° from the state of FIG. 3B and the information 1011 has shifted by a length of one side of the hexagonal pattern.

As also seen from FIGS. 3A, 3B and 3C, various types of shift registers can be constructed by the employment of the magnetic bubble transmission system of this invention, so that the system of this invention is excellent in the efficient utilization of the magnetic thin plate surface.

With reference to FIGS. 5A, 5B, 5C, 5D and 5E, one example of a logical operation circuit using repulsion between two magnetic bubbles will be described. In FIGS. 4A to 4D, there is illustrated a logical operation circuit, in which branching positions $D_2$ and $D_4$ are input positions of logical variables $X_1$ and $X_2$ while branching positions $D_1$, $D_3$ and $D_5$ are output positions of logical functions $Z_1$, $Z_2$ and $Z_3$. FIGS. 5(*a*) and 5(*b*) show the operation of the magnetic bubble in a case where a magnetic force is applied only to the input position $X_1$. In this circuit, there is a difference between easiness of transmission of the magnetic bubble from the branching position $D_2$ to another branching position $D_3$ and that from the branching position $D_2$ to that $D_1$ and, similarly, there is a difference between easiness of the magnetic bubble transmission from the branching position $D_4$ to that $D_3$ and that from the position $D_4$ to the position $D_5$. To perform this, large transmission direction specifying thin films are used for facilitate the magnetic bubble transmission from the branching position $D_2$ to that $D_3$ and from the branching position $D_4$ to that $D_3$, as shown in the illustration. Consequently, if the bias magnetic field is reduced a little in the state that one magnetic bubble exists only at the branching position $D_2$, the magnetic bubble end $W_2$ approaches the branching position $D_3$ as shown in FIG. 5(*a*). If the bias magnetic field is restored to its original value in synchronism with the rotation of the rotating magnetic field Hr from a broken-line direction to a direction indicated by a solid line L, the magnetic bubble B resumes its original circular configuration and, at the same time, it is attracted to the intensified magnetization at the branching position $D_3$ and stably stands still there. This relationship holds true also in a case where one magnetic bubble exists only at the branching position $D_4$ and the magnetic bubble is transmitted not to be the branching position $D_5$ but to the branching position $D_3$.

Figure 4A:
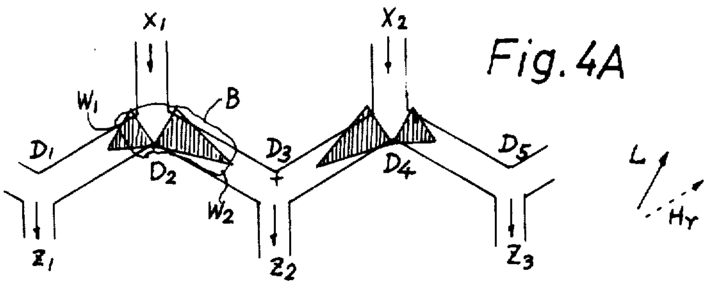
Figure 4B:
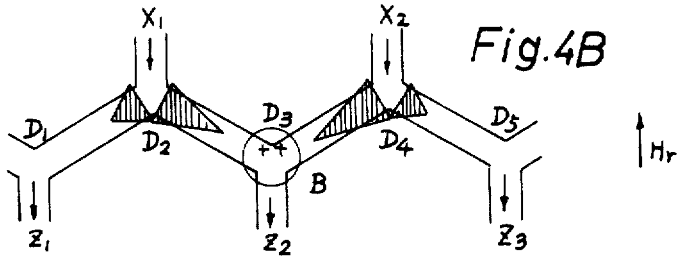
Figure 4C:
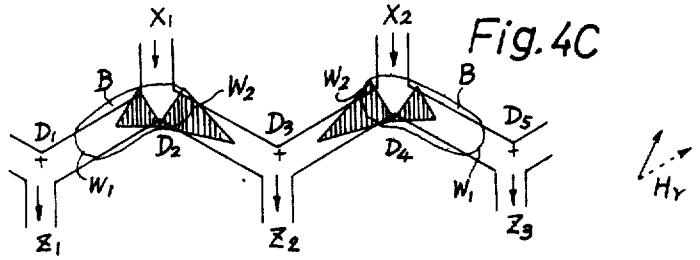
Figure 4D:
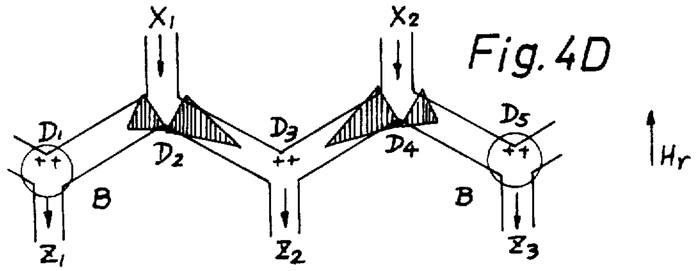

Next, in a case where the magnetic bubbles exist at both of the branching positions $D_2$ and $D_4$, repulsion acts between the two magnetic bubbles in the state where the bias magnetic field is reduced, as shown in FIG. 4C. As a result of this, the magnetic bubble ends $W_2$ do not extend toward the branching positions $D_3$, while the magnetic bubble ends $W_1$ extend to approach the branching positions $D_1$ and $D_5$, respectively. Consequently, when the bias magnetic field is returned to its original value in synchronism with the rotation of the rotating magnetic field Hr in a predetermined direction as is the case with the foregoing, the magnetic bubbles. B resume their original circular configuration and, at the same time, they are attracted to the intensified magnetization at the branching positions $D_1$ and $D_5$ to stably stand still at these branching positions $D_1$ and $D_5$, respectively.

As will be apparent from the foregoing description, in a case where the magnetic bubble enters either the position $X_1$ or $X_2$ of this circuit, an output is obtained only at the position $Z_2$. Only in a case where the magnetic bubbles enter the positions $X_1$ and $X_2$ at the same time, outputs are obtained at the positions $X_1$ and $Z_3$ and no output is preduced at the position $Z_2$. This can be expressed by the following logical equations:

$$Z_1 = Z_3 = X_1 \cdot X_2$$

$$Z_2 = X_1 + X_2$$

Figure 4E:
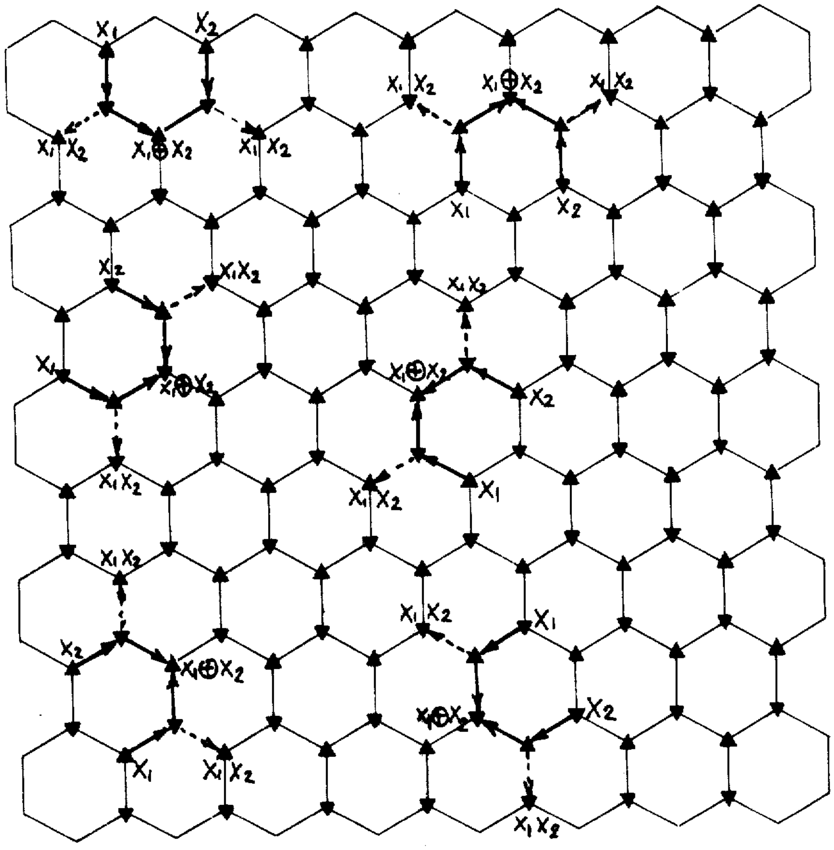

In this case, logical functions $Z_1$ and $Z_3$ are AND logics, while the logical function $Z_2$ is an exclusive-OR logic. In FIG. 4E, there is shown this logical circuit illustrated by the same illustration principle as in FIGS. 3A, 3B and 3C. As seen from the illustration, this logical operation circuit has also a variety of arrangements and, for example, when combined with the aforesaid shift registers, various information processing circuits can be constructed so that substantially the entire area of the plane of the magnetic thin plate is effectively utilized.

Figure 5A:
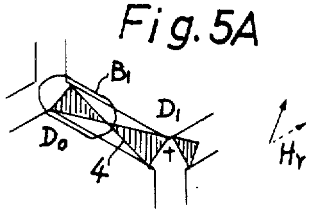
Figure 5B:
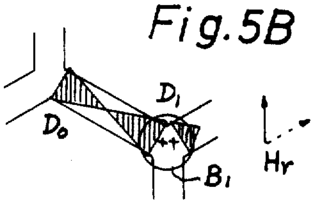
Figure 5C:
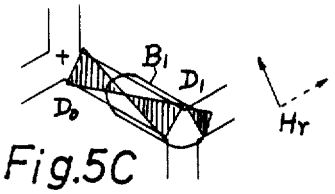
Figure 5D:
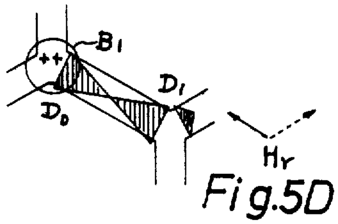
Figure 5E:
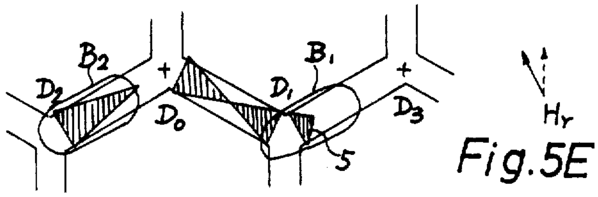
Figure 5F:
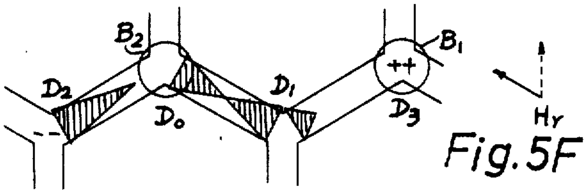
Figure 5G:
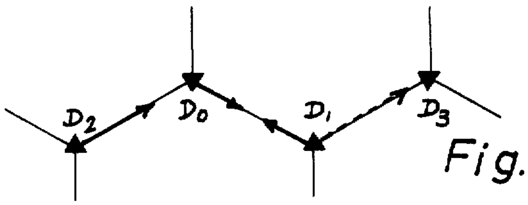

With reference to FIGS. 5A, 5B, 5C, 5D, 5E, 5F 5G, a circuit which combines the reciprocating motion and repulsion of the magnetic bubbles as other means for controlling the direction of transmission of the magnetic bubble will be described. FIGS. 5A to 5D show circuits, in which two triangular direction specifying thin films 4 are disposed between the branching positions $D_0$ and $D_1$ so that their vertexes are in contact with each other for effecting the reciprocating motion of the magnetic bubbles. FIG. 5A shows the state, in which, when the rotating magnetic field is turned from the direction of the broken-line arrow to that of the solid line arrow, a magnetic bubble $B_1$ having stably rest at the branching position $D_0$ extends under the influence of the reduction of the bias magnetic field. FIG. 5B shows the state, in which, since the bias magnetic field is returned to its original value at the same time as the rotating magnetic field is directed in the direction of the solid-line arrow from the direction of the broken-line arrow, the magnetic bubble $B_1$ is attracted to the intensified magnetization of the branching position $D_1$ to stably rests at the branching position $D_1$. In this circuit, as shown in FIGS. 5C and 5D, the magnetic bubble $B_1$ returns from the branching position $D_1$ to another position $D_0$ in the same manner as described previously with regard to FIGS. 5A and 5B, so that the magnetic bubble $B_1$ reciprocates three times between the branching positions $D_1$ and $D_0$ while the rotating magnetic field rotates by one cycle of 360°. FIG. 5E shows the state in which the bias magnetic field has been reduced in a case where magnetic bubbles $B_1$ and $B_2$ exist at the both branching positions $D_1$ and $D_2$. In this case, since the magnetic bubble $B_2$ at the branching position $D_2$ always extends towards the branching position $D_0$, the magnetic bubble $B_1$ is repelled by the magnetic bubble $B_2$ and prevented thereby from extending toward the branching position $D_0$ but extends toward the side of the branching position $D_3$ where a short direction specifying thin film 5 exists, so that the two magnetic bubbles stably rest at the branching positions $D_0$ and $D_3$, respectively, as shown in FIG. 5F. Namely, as will be understood from FIGS. 5E and 5F, the magnetic bubble having been reciprocating between the branching positions $D_0$ and $D_1$ can by derived from the reciprocation path by applying a magnetic bubble to the adjoining branching position $D_2$. FIG. 5G is a diagrammatic refresentation of FIGS. 5E and 5F, in which coupling between the branching positions $D_0$ and $D_1$, that between the branching position $D_2$ and $D_0$, that between the branching positions $D_1$ and $D_3$ and that between the branching positions where no direction specifying thin film exists are referred as reciprocatory coupling, strong coupling, weak coupling and non-coupling, respectively. The reciprocating coupling, the strong coupling and the weak coupling are indicated by opposite arrows, a large arrow and a broken-line arrow, respectively.

Figure 6A:
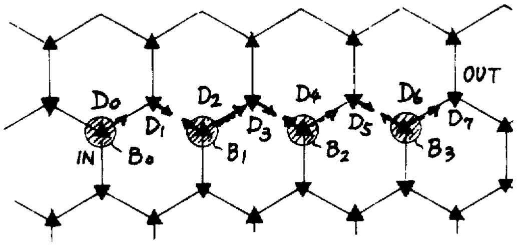
Figure 6B:
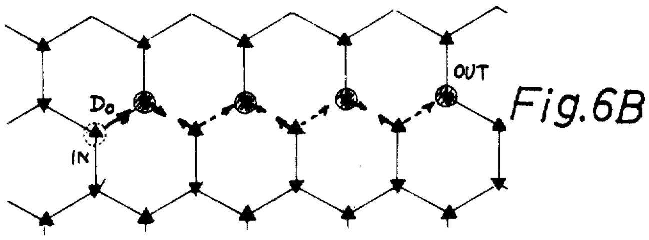
Figure 6C:
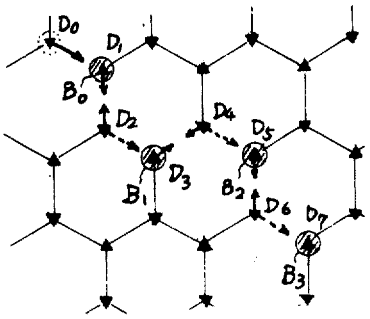
Figure 7A:
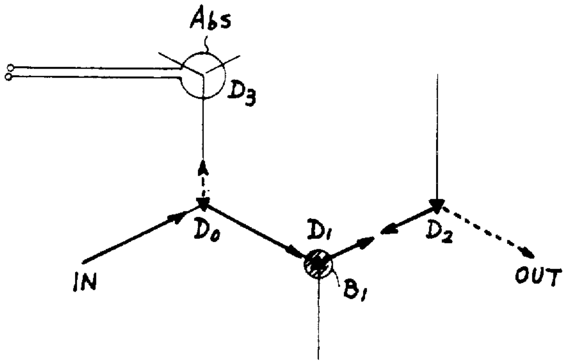
Figure 7B:
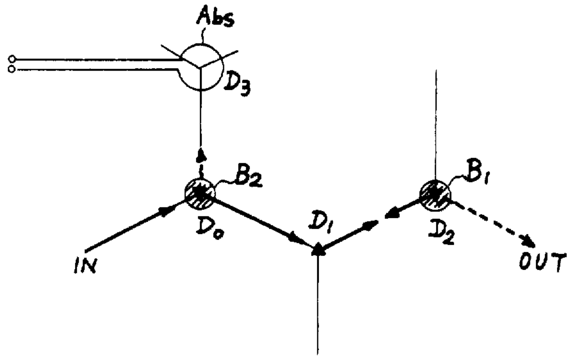
Figure 7C:
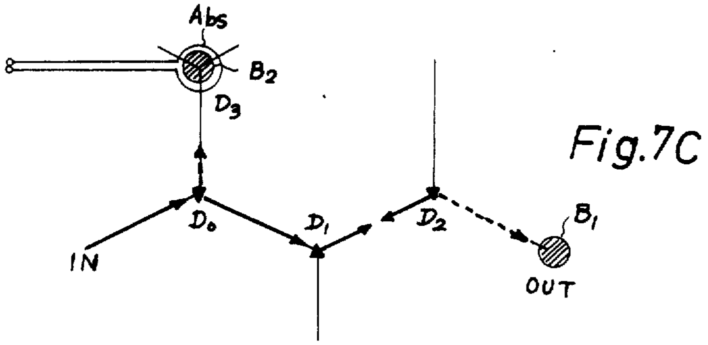

With reference to FIGS. 7A, 7B and 7C, magnetic bubble high-speed transmission circuits employing the transmitting direction control described above in connection with FIGS. 5A to 5G will be described. In this circuit, magnetic bubble transmission paths of reciprocating coupling and weak coupling are alternatively arranged in series, and one magnetic bubble is always reciprocated in each reciprocating coupling line. A state in which one magnetic bubble $B_0$ has entered the input position $D_0$ of this circuit is shown in FIG. 6A. A state in which the rotating magnetic field has turned by an angle of 60° from the direction of the above case is shown in FIG. 6B. In this case, if the magnetic bubble $B_0$ does not enter the input position $D_0$, magnetic bubbles rested at the branching positions $D_2$, $D_4$ and $D_6$ move to the branching positions $D_1$, $D_3$ and $D_5$, respectively. However, since the magnetic bubble $B_0$ enters the branching position $D_0$ and shifts to the branching position $D_1$ through the strong coupling path, the magnetic bubble $B_1$ cannot move to the branching position $D_1$ and tends to shift to the branching position $D_3$. As a result of this, the magnetic bubble $B_2$ is repelled by the magnetic bubble $B_1$ and cannot return to the branching position $D_5$ but tends to move to the branching position $D_5$. Thus, repulsion between adjacent magnetic bubbles is produced throughout the circuit substantially at the same time, so that the magnetic bubble $B_3$ at the last stage is pushed out to be derived from an output position $D_7$. The magnetic bubble high-speed transmission circuit is a circuit in which, instead of practically transmitting one magnetic bubble over a long distance, two points between which a magnetic bubble is to be transmitted are interconnected by this circuit so that the magnetic bubble is equivalently transmitted over a long distance in the period of time during which the rotating magnetic field rotates by an angle of 60°. This circuit is an important circuit among magnetic bubble circuits which are not so high in transmission speed. FIG. 6C illustrates a magnetic bubble high-speed transmission circuit which is different in construction from the above circuit. This magnetic bubble high-speed transmission circuit may also be constructed in various forms as is the case with the shift register circuit described previously with regard to FIGS. 3A to 3C.

Figure 7D:
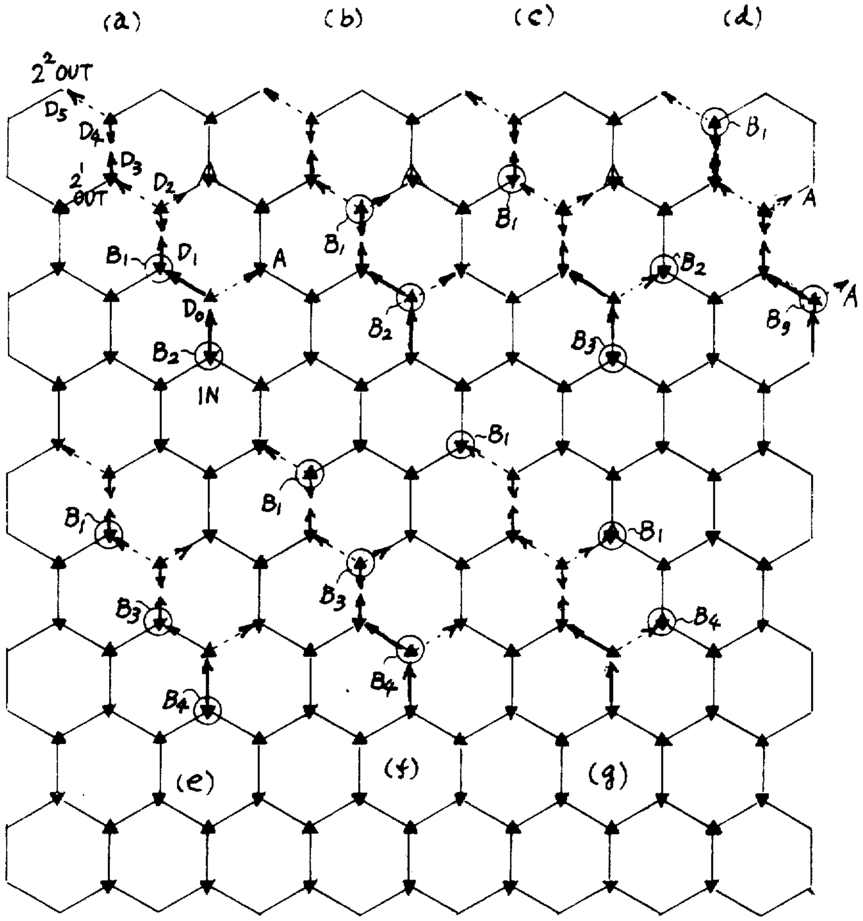

With reference to FIGS. 7A, 7B, 7C and 7D, a binary counter employing the transmitting direction control means described previously in connection with FIGS. 6A to 6G. FIGS. 7A, 7B and 7C illustrate a binary counter which employs the strong coupling between an input IN and the branching position $D_0$ and between the branching positions $D_0$ and $D_1$, the reciprocating coupling between the branching positions $D_1$ and $D_2$, the weak coupling between the branching position $D_2$ and an output OUT and the weakest coupling between the branching positions $D_0$ and $D_3$. FIG. 7A shows a state, in which the magnetic bubble $B_1$ exists at the branching position $D_1$. If no magnetic bubble does not enter the input IN in the above state, the magnetic bubble $B_1$ reciprocates between the branching positions $D_1$ and $D_2$ forever. FIG. 7B shows a state, in which a magnetic bubble $B_2$ applied to the input IN in the state of FIG. 7A has entered the branching position $D_0$ and the magnetic bubble $B_1$ has moved to the branching position $D_2$. FIG. 7C shows a state, in which the rotating magnetic field has further turned by an angle of 60° from the direction in the state of FIG. 7B. In this state, the magnetic bubbles $B_1$ and $B_2$ both tend to shift to the branching position $D_1$ but, by strong repelling power of the two magnetic bubbles, the magnetic bubble $B_1$ moves to the output OUT through the weak coupling path and the magnetic bubble $B_2$ moves to the branching position $D_3$ through the weakest coupling path. A reference character Abs indicates an absorber formed by, for example, a current loop, for absorbing and erasing the magnetic bubble having moved to the branching position $D_3$. As will be seen from the above description, this circuit is a binary counter adapted such that two magnetic bubbles enter and one magnetic bubble is obtained at the output. It is apparent that, in the case of forming a scale-of-$2^n$ counter using the above circuit, binary counters are serially connected in $n$'s stages. FIG. 7D illustrates a scale-of $2^2$ counter which is constructed by connecting in cascade binary counters in two stages. As shown in the illustration, the paths between the branching positions $D_1$ and $D_2$ and between $D_3$ and $D_4$ are of reciprocating coupling and the branching position $D_3$ is a scale-of-$2'$ outpt position and the branching position $D_5$ is a scale-of-$2^2$ output position. At every 120°-rotation of the rotating magnetic field, one magnetic bubble enters from the input IN. The states of the magnetic bubbles in cases of every rotation of 60° of the rotating magnetic field are shown at parts ($a$) to ($g$) in FIG. 7D in a sequential order. No detailed description will be given in connection with the movement of the magnetic bubbles. A part ($c$) in FIG. 7D shows a state, in which the two magnetic bubbles $B_1$ and $B_2$ applied to the circuit have been counted and the magnetic bubble $B_1$ has moved to the scale-of-$2^1$ output position while the magnetic bubble $B_2$ has been absorbed by the absorber. Further, a part ($g$) in FIG. 7D shows a state in which, after the state shown in a part ($c$) in FIG. 7D, two more magnetic bubbles $B_3$ and $B_4$ have been applied to the circuit and the magnetic bubble $B_1$ has moved to the scale-of-$2^2$ output position while the magnetic bubbles $B_3$ and $B_4$ have been absorbed by the absorbers. As is apparent from the above operation, this circuit is a scale-of-$2^2$ (= 4) counter in which four magnetic bubbles enter and only one of them is obtained at the output OUT.

While foregoing description has been made in connection with the construction in which the transmission thin film and the direction specifying thin film are both formed by soft magnetic thin films, it is also possible to replace the soft magnetic thin films by means formed by driving appropriate ions in the magnetic thin plate except those area of desired soft magnetic honeycomb patterns in accordance with the ion implantation technique.

As has been described in the foregoing, the magnetic bubble transmission system of this invention gives variety in the magnetic bubble transmission by adding the magnetic bubble transmitting direction specifying thin film to a required side between the branching positions of the honeycomb magnetic bubble transmission path, and the system of this invention is excellent in the point of effective use of the surface plane of the magnetic thin plate, and hence is capable of high-density information processing. Further, the magnetic bubble transmission thin film may be of the same pattern even in the cases of forming circuits of different functions, and various information processing circuits can be constructed by changing only the pattern of the direction specifying thin film, so that the design and fabrication of the circuits are both easy. Thus, the system of this invention is also very advantageous from the industrial point of view.

What we claim is:

1. A magnetic bubble transmission system, comprising:

a magnetic thin plate for causing therein at least one magnetic bubble;

bias means for applying a bias magnetic field to said magnetic thin plate in a direction perpendicular to the surface thereof;

rotation means for applying a rotating magnetic field to said magnetic thin plate along the surface thereof;

a honeycomb soft magnetic thin film formed into substantially hexagonal patterns and disposed on said magnetic thin plate in close contact therewith;

direction specifying means of thin films coupled to said honeycomb soft magnetic thin film for giving priority order of the transmission direction of said magnetic bubble from each of branching positions of said honeycomb soft magnetic thin film positioned at each of vertex of each of said hexagonal patterns to three sides thereof contiguous to said branching positions, said thin films being disposed on at least one of said three sides; and control means connected to said bias means and said rotation means for reducing and restoring said bias magnetic field in synchronism with the rotation cycle of said rotation magnetic field.

2. A magnetic bubble transmission system according to claim 1, in which said honeycomb soft magnetic thin film is further provided with regular triangel triangle at each of said branching positions.

3. A magnetic bubble transmission system according to claim 1, in which said direction specifying means of thin films are formed into isosceles triangles each having a base positioned at the branching position.

4. A magnetic bubble transmission system according to claim 1 in which said direction specifying means of thin films are formed into pairs of isoceles triangles having different hights from each other and having tops respectively positioned at two sides of said three sides.

5. A magnetic bubble transmission system according to claim 4, further comprising isoceles triangles each provided on one of said two sides so that their tops are each contacted with the top of the one of said pairs of isoceles triangles.

* * * * *